United States Patent
Darling et al.

[11] Patent Number: 5,834,230
[45] Date of Patent: Nov. 10, 1998

[54] VISCOSITY PROBE

[75] Inventors: Graham D. Darling, Montreal; Seymour Heisler, deceased, late of Montreal, by Renee Heisler, executor; Brent R. Stranix, Montreal, all of Canada; Petra Turkewitsch, St. Georges de la Maibair, Canada; Barbara Wandelt, Lodr, Poland

[73] Assignee: McGill University, Canada

[21] Appl. No.: 685,047

[22] Filed: Jul. 23, 1996

Related U.S. Application Data

[63] Continuation-in-part of Ser. No. 289,062, Aug. 11, 1994, abandoned.

[30] Foreign Application Priority Data

Aug. 12, 1993 [GB] United Kingdom .................... 9316789

[51] Int. Cl.⁶ .............................. C12Q 1/02; C12Q 1/00; G01N 33/53; C09B 44/08

[52] U.S. Cl. ................... 435/29; 435/4; 435/7.24; 435/7.25; 435/968; 436/63; 436/800; 534/605; 73/54.01; 137/92

[58] Field of Search ................... 435/29, 4, 7.24, 435/7.25, 968; 436/63, 800; 534/605; 73/54.01; 137/92

[56] References Cited

PUBLICATIONS

Abdel–Mottaleb; Laser Chem., vol. 4, pp. 305–310, (1984) Month not available.

*Primary Examiner*—Louise Leary
*Attorney, Agent, or Firm*—Bachman & LaPointe, P.C.

[57] ABSTRACT

Substituted aminostyrylpyridinium salts are fluorescent dyes having advantageous characteristics when employed as viscosity probes for the measurement of viscosity in a liquid, especially in a very small volume, for example, in living cells.

3 Claims, 3 Drawing Sheets

VISCOSITY PROBE

CROSS-REFERENCE TO RELATED APPLICATION

This Application is a Continuation-in-Part of U.S. patent application Ser. No. 08/289,062, filed Aug. 11, 1994 abandoned.

BACKGROUND OF THE INVENTION i) Field of the Invention

This invention relates to substituted aminostyrylpyridinium salts and their use as viscosity probes for measurement of the viscosity of a liquid.

The invention also relates to certain novel substituted aminostyrylpyridinium salts.

ii) Description of Prior Art

The viscosity of a solution, for example, an aqueous solution, is a function of the size, concentration, and nature of the molecules, particularly macromolecules, dissolved therein. Normally, this parameter is deduced from the rate of passage of: a volume, typically several to tens of milliliters, of the liquid through a small hole or capillary tube. However, this technique is not appropriate for measuring specific values or variations of viscosity on a very small scale such as are known, or suspected, to accompany many important biological processes and some pathological conditions; motion of mucus along respiratory passages, notoriously inefficient in people with cystic fibrosis, partly because of admixture with extremely viscous DNA; or motion, for example contraction in smooth muscle, extrusion of pseudopods in leukocytes, or tonicity or other changes, for example mitosis, within individual cells. One existing microscale technique is to microscopically observe and quantify the movement of tiny magnetic particles in a steady or oscillating magnetic field (M. King and P. Macklem, J. Appl. Physicl. 42, 797 (1977)).

A better method would involve the addition of a fluorescent dye whose emission, wavelength, intensity and/or polarization, is strongly and specifically sensitive to the viscosity of the local microenvironment; such a strategy, making use of existing hardware such as that for determination of intracellular calcium ion by fluorescence microscopy, using the Fura-2 "molecular probe", could give realtime measurements of viscosities in small volumes, such as different parts within a living cell as it actually functions and responds to stimuli.

V. W. Burns, Biochem. Biophys. Res. Comm. 37, 1008 (1969) and Experim. Cell. Res. 64, 35 (1971), describe the use of fluorescein to determine average viscosities within cells suspended in culture, of yeast (10–15 cP) and Euglena (6 cP). The technique makes use of polarization spectroscopy; light emitted from a fluorescein molecule irradiated with polarized light is depolarized according to the rate of tumbling of the entire molecule, which itself depends on the viscosity of the medium. The technique was shown useful only to measure the average viscosity of all cells in a culture, rather than within individual cells (non-"imaging"); it was also sensitive to scattering, and interference from extracellular fluorescein even with washed cells due to continuous leakage of fluorescein back out of cells even at room temperature.

M. S. A. Abdel-Mottlieb, Laser Chem. 4, 305 (1984), observed an increase in the quantum yield of fluorescence of 2-(4-dimethylaminostyryl)-1-methylpyridinium iodide dissolved without other solutes in organic solvents of increasing viscosity and suggested that this molecule can therefore be used as a fluorescent probe to study microscopic structural changes in surrounding media occurring on the picosecond time scale; however, without provision for an internal standard, this method cannot be used to measure the viscosity of a liquid in which any of the intensity of exciting radiation, the concentration of the molecule or the thickness of the sample are unknown. M. L. Viriot et al, Photobiochem. Photobiophys. y1983 v5 p293, measured viscosity by comparing ("ratioing") two kinds of fluorescence from dipyrenyl alkanes, which is a technique that depends neither on the intensity of excitation, the concentration of the fluorescent molecule nor the geometry of the sample; but these molecules prefer the hydrophobic environment of a cell's membrane over its cytoplasm, and are similarly not useful to measure viscosities of aqueous solutions because of their insolubility therein; moreover the viscosity-dependance of their fluorescence involves intramolecular excimer formation, a different mechanism than Twisted Intramolecular Charge Transfer (TICT; W. Rettig, Angew. Chem. Int. Ed. Engl. 25, 971 (1986)).

Syrups or other edible liquids, petroleum mixtures, lubricating liquids, polymerization reactions, sewage, pulp effluent, and other aqueous or non-aqueous liquids also vary widely in viscosity depending on the composition of the mixture and its processing, and viscosity probes would also have application in the determination of the viscosity of such mixtures at discrete times or on a continuing basis.

SUMMARY OF THE INVENTION

It is an object of the present invention to provide a family of substituted aminostyrylpyridinium salts which are fluorescent dyes which can be employed with advantage as viscosity probes.

In accordance with the invention there is provided a fluorescent probe for measurement of viscosity of a liquid comprising a substituted aminostyrylpyridinium salt of formula (I)

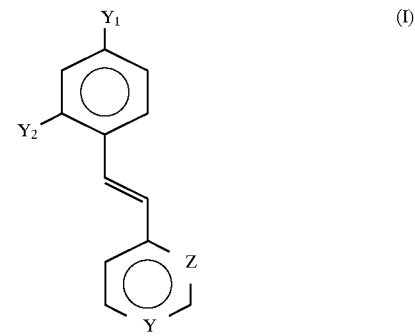

wherein one of $Y_1$ and $Y_2$ is

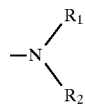

and the other is H, $R_1$ and $R_2$, which may be the same or different are straight or branched chain lower alkyl of 1 to 6 carbons or $R_1$ and $R_2$ together with the N atom to which they are attached form a cyclic ring of 5 or 6 ring atoms; one of Z and Y is >N$^+$—R X$^-$ and the other is CH; R is selected from: (a) —(CH$_2$)$_n$R$_3$ in which n is an integer of 0 to 15 and R$_3$ is aryl of 6 to 14 carbon atoms, alkyl of 1 to 10 carbon atoms, amino, dialkylamino in which each alkyl is straight or branched chain of 1 to 6 carbon atoms or cyclic of 5 or 6 carbon atoms, or acyl $R^6$—CO— in which $R^6$ is alkyl of 1 to 16 carbon atoms, aryl of 6 to 14 carbon atoms or aralkyl in which the aryl moiety has 6 to 14 carbon atoms and the alkyl moiety has 1 to 16 carbon atoms, (b) —$(CH_2)_mCOOR_4$ in which m is an integer of 1 to 10 and $R_4$ is a straight or branched chain alkyl of 1 to 18 carbon atoms, aryl of 6 to 14 carbon atoms, aralkyl in which the alkylene moiety has 1 to 18 carbon atoms and the aryl moiety has 6 to 14 carbon atoms, said aryl and aryl moiety being unsubstituted or substituted one or more times by one or more of nitro, fluoro, chloro, bromo, iodo and carboxylate; (c) —$(CH_2)_pArCOO^-$ in which p is 0 to 15, Ar is arylene of 6 to 14 carbon atoms unsubstituted or substituted one or more times by one or more of nitro, fluoro, chloro, bromo, iodo, carboxylate or —$COOR_4$ in which $R_4$ is as defined above, (d) —$(CH_2)_p ArCOOR^4$ in which p, Ar and $R^4$ are as defined above, and $X^-$ is selected from chloride, bromide, iodide, toslylate, mesylate and brosylate.

In another aspect of the invention there is provided a method of measuring viscosity of a liquid in which dual fluorescence of a fluorescent dye in the liquid is measured and the viscosity is determined from the measured dual fluorescence, wherein the fluorescen dye is a substituted aminostyrylpyridinium salt of the invention.

In still another aspect of the invention there is provided a method of measuring viscosity of a liquid comprising contacting the liquid with a fluorescent probe of the invention, allowing the fluorescent probe to dual fluoresce and evaluating the dual fluorescence as a measure of viscosity of the liquid.

The invention also provides novel salts of formula (I).

The novel salts are in particular salts in which R is selected from a) —$(CH_2)_mCOOR_4$ in which m is an integer of 1 to 10 and $R_4$ is a straight or branched chain alkyl of 3 to 18 carbon atoms, aryl of 6 to 14 carbon atoms, aralkyl in which the alkylene moiety has 1 to 18 carbon atoms and the aryl moiety has 6 to 14 carbon atoms, the aryl and aryl moiety being unsubstituted or substituted one or more times by one or more of nitro fluoro, chloro, bromo, iodo and carboxylate, (b) —$(CH_2)_pArCOO^-$ in which p is 0 to 15, Ar is arylene of 6 to 14 carbon atoms, unsubstituted or substituted one or more times by one or more of nitro, fluoro, chloro, bromo, iodo, carboxylate or —$COOR_4$ in which $R_4$ is as defined above, and (c) —$(CH_2)_pArCOOR^4$ in which p, Ar and $R^4$ are as defined above.

Especially preferred salts (I) are those in which $Y_1$ is

$Y_2$ is H, Z is CH and Y is >$N^+$—R $X^-$ and in which (a) R is —$CH_2CH_2N(CH_3)_2$ and $X^-$ is chloride; (b) R is benzyl and $X^-$ is chloride; (c) R is phenylethyl and $X^-$ is bromide; and (d) R is —$CH_2COOBu$, in which Bu is butyl, especially n-butyl, and $X^-$ is chloride.

The invention also provides a process for preparing the novel salts.

The new viscosity probes can be produced by a simple synthesis and include "caged" dyes capable of irreversible permeation into cells. They display increased sensitivity and selectivity of fluorescence to viscosity by a mechanism involving rapid intramolecular charge transfer with formation of a TICT state, and emission and excitation spectra of shape, as well as size, dependent on viscosity, permitting conclusions on viscosity which are independent of actual concentration of dye loaded into cells; they permit ready real-time images of viscosity throughout a live cell; human muscle cells loaded with the dye remain viable; by varying the temperature of he sample, whether by pulse or slow drift, activation energy ($E_a$) can be quantified for characterization of he nature of the solutes, for example DNA vs polypeptides vs carbohydrates.

DESCRIPTION OF PREFERRED EMBODIMENTS

In the case of aryl radicals or moieties of 6 to 14 carbon atoms these are, in particular, phenyl, naphthyl and anthracyl.

A particularly preferred group of salts within formula (I) is the class of dialkylaminostyrylpyridinium salts of formula (II):

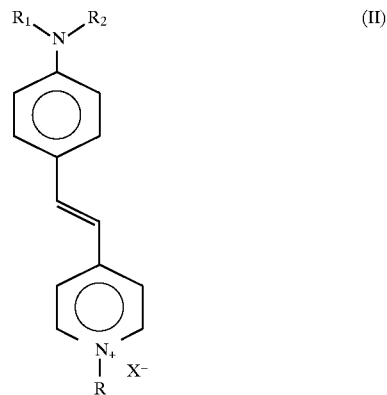

wherein $R_1$ and $R_2$, which may be the same or different are straight or branched chain lower alkyl of 1 to 6 carbons; R is selected from: (a) —$(CH_2)_nR_3$ in which n is an integer of 1 to 15 and $R_3$ is phenyl, alkyl of 1 to 10 carbon atoms or dialkylamino, in which each alkyl is straight or branched chain of 1 to 6 carbon atoms provided that when $R_3$ is alkyl, the total carbon atom content of R is not more than 16, and (b) —$(CH_2)_mCOOR_4$ in which m is an integer of 1 to 10 and $R_4$ is a straight or branched chain alkyl of 1 to 6 carbon atoms; and $X^-$ is a halide ion selected from chloride, bromide and iodide.

In one preferred embodiment the liquid is an aqueous liquid, and in particular a very small volume of aqueous liquid.

In another embodiment the liquid is lipophilic, for example, a petroleum mixture. In this embodiment the substituents R, $R_1$ and $R_2$ are preferably large, hydrophobic radicals soluble in oil phase. In this embodiment the viscosity may be measured in a microvolume or a macrovolume.

In the embodiment in which the liquid is an aqueous liquid the viscosity may be measured in a microvolume, for example, within biological cells or in a macrovolume.

The viscosity may be determined for individual cells or as an average viscosity of a plurality of the cells in suspension or as a film on a support layer or strip.

The viscosity measurement may employ single excitation from a single emission, double excitation from a single emission or double emission from a single excitation.

The colour change or fluorescence which is produced may be one detectible to the naked eye or one which is detected by instruments, such as a spectrofluorimeter or a fluorescence microscope with attached image analyzer.

In vitro studies show that dual fluorescence of these probes is independent of pH, ionic strength, and other factors than viscosity, except insofar as these affect viscosity, though high concentrations of some anions, apart from chloride, have an effect. Dual fluorescence of these molecules is also inversely proportional to temperature, though where temperature is known or kept constant, it can be accounted for. Dual fluorescence of these molecules is also affected by polarity, but in a manner different and independent of viscosity, by shifts in peak wavelengths (solvatofluochromism) rather than changes in intensities. Calibration against standard viscometric techniques yields similar calibration curves for different solutes; changes in the emission and excitation spectra with viscosity lend themselves readily to ratioing techniques for viscosity determination.

Applications of these dyes to measuring slow changes in viscosity during cell division or rapid changes during pseudopodal motion of leukocytes, particularly, with contraction or relaxation of smooth muscle cells to provide a means of directly observing contractile state of smooth muscle cells in culture; this technique may displace current measurements of "second messenger" levels, such as calcium ions, to evaluate cell response vs stimuli, for example for drug screening, tissue typing or diagnosis of medical conditions.

In particular, the fluorescent dye viscosity probes of the invention are intramolecularly-relaxing compounds exhibiting dual fluorescence spectra in polar solvents. Such dual fluorescence can be explained by the presence of two kinds of excited states arising from twisted intramolecular charge transfer, which makes the compounds very sensitive to the microenvironment surrounding the fluophore. Observed excitation wavelength dependence and strong red edge effect in more viscous solvents support a model of twisted intramolecular charge transfer (TICT) accompanied by viscosity-dependent torsional motion during irradiation of these compounds.

The methods of the invention employ the property of dual fluorescence in double excitation-single emission and single excitation-double emission techniques; this permits standard-free ratio measurement of viscosity, and is thus significantly distinguished from the single excitation-single emission technique employing simple fluorescence and requiring an internal standard, as described by Abdel-Mottalab referred to hereinbefore.

The preferred para-para substitution pattern in the compounds of the invention provides maximum separation between the —NR$_1$R$_2$ group and the pyridinium centre, so that the dye is minimally affected by the presence of other anions.

The method of the invention has particular utility in measuring the presence of viscosity-inducing solutes such as macromolecules.

The manufacture of the substituted aminostyrylpyridinium salts of the invention is illustrated below and specific compounds RX are identified for four preferred salts of the invention.

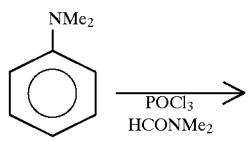

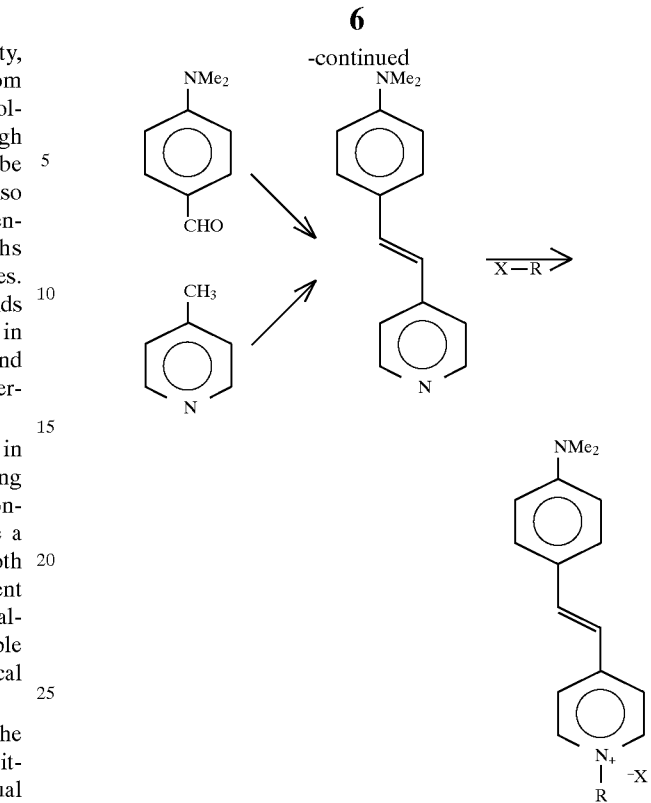

Salt (1) is found to be impermeable to cell membranes and can be used as a viscosity probe for determination of the viscosity of only extracellular fluids. Salts (2) and (3) readily permeate into smooth muscle cells at 37° C. and remain within the cells upon cooling to room temperature; salt (4) permeates readily but is then transformed by cellular enzymes to a membrane-impermeable form that remains in the cell indefinitely even at 37° C. In this regard salt (4) is an example of caged dyes, the ester being converted to the free acid after passage into the environment whose viscosity is to be determined.

EXAMPLES

Figure 1:
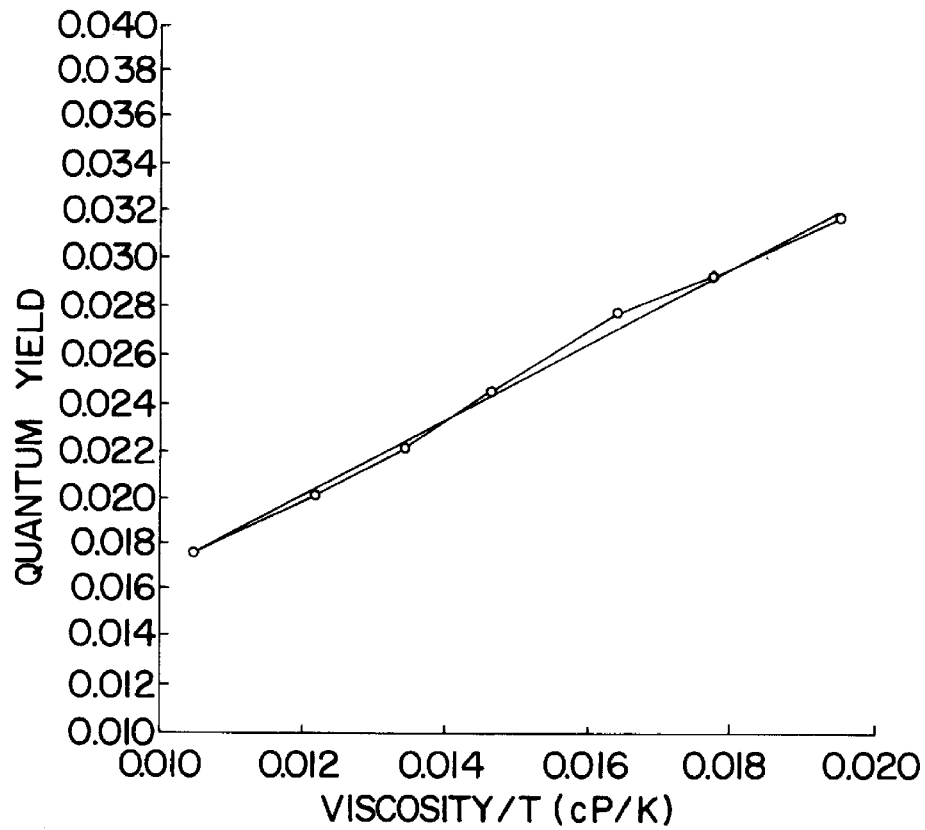
FIG. 1 is a viscosity calibration curve for a compound (I) of the invention, employing single excitation-single emission (quantum yield, non-ratioing) mode.

The invention is further illustrated by the following Examples.

Example 1(a)

Synthesis of Carboxymethyl esters of Dimethylaminostyrylpyridinium salts

Dimethylaminostyrylpyridine

Reaction of 4-picoline with benzoyl chloride at 0° C. to yield the 1-benzoyl salt of 4-picoline. This was then reacted with p-dimethylamino benzaldehyde (DMAB) to obtain the 4-p-dimethylaminostyrylpyridine.

Materials
 4-picoline: 20 ml
 benzoyl chloride: 5 m
 DMAB: 10.16 g

Experimental

To picoline (5 ml) was added dropwise benzoyl chloride in an oven-dried 3-necked 100 ml round bottom flask with strong magnetic stirring and cooling in an ice bath. To this mass was added the solution of DMAB in 15 ml picoline. The reaction mixture became red and upon heating. The mixture was heated to reflux (~150° C.) for ~5 hrs. (reflux condenser was topped with a drying tube).

The reaction mixture was cooled and decomposed with ~30 ml of conc 12N HCl. After stirring the solution for about 20 min, the solution was alkalized by the addition of ~50ml 5N KOH. The red-brown precipitate was collected on fluted filter paper and washed a few times with hot water. The crystals were placed in a recrystallizing dish in the fume-hood overnight.

The solid was dissolved in ~300 ml 0.5N HCl and heated to the boiling point. 10 large scoops of active carbon was added and the solution was boiled ~½ an hour. The carbon was filtered away and the product was precipitated with ~1 ml 6N, and 15 ml 3N ammonium hydroxide. The brownish-red product was collected and then dissolved in ~600 ml 95% boiling ethanol. The solution was cooled, crystals formed. 3N ammonia was added dropwise. The muddy-yellow precipitate was collected, washed with cold ethanol and recrystallized once more from 95% ethanol, then dried in a vacuum oven at 80° C. overnight.

Wt of crystals: 3.11 g 32.2% yield
 mp: 245°–246° C.

Quarternization of dimethylaminostyrylpyridine with chloroacetate esters

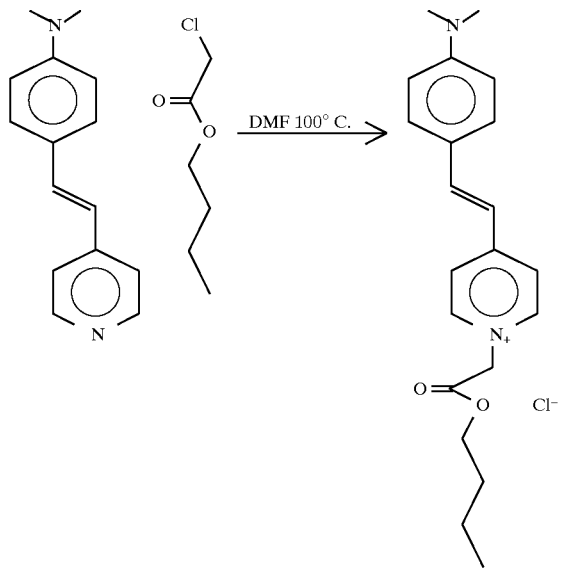

Reaction of chloroacetate esters with dimethylaminostyrylpyridine (DSP) in Dimethylformamide (DMF)

Materials
 0.98 g DSP (4.37 mmol)
 0.98 g Butyl chloroacetate (6.53 mmol)
 DMF 15 mls (Reagent grade, BDH)
 Diethyl ether 150 ml (BDH)

Experimental

DSP (0.98 g, 4.37 mmol) was dissolved in 10 ml DMF in a flame dried 2-neck RBF at 100° C., in a nitrogen atmosphere. Butylchloroacetate in 5 ml DMF was added slowly dropwise to the hot solution which turned deep red.

The solution was stirred 5 hrs at 100° C. under nitrogen. The reaction was followed by TLC (dichloromethane as eluent). The mixture was cooled to 50° C. and poured in 150 ml diethylether whereupon a red precipitate formed.

The precipitate was filtered and washed with ethanol then dried in vacuo overnight.

Yield 1.37 g, 3.65 mmol, 83.6%
 Melting point 197.5°–199.2° C.

Example 1(b)

Following the procedure of Example 1(a) but employing dimethylaminoethylene chloride there was produced salt (1) in the form of an oil having the following characteristics H-NMR 8.05 (d, aryl H), 7.43 (d, aryl H), 7.15 (d, vinyl H), 6.43 (d, vinyl H), 3.48 (s, aryl N-CH$_3$), 3.08 (s, alkyl N-CH$_3$), 2.48 (m, —CH$_2$CH$_2$—).

Example 1(c)

Following the procedure of Example 1(a) but employing benzyl chloride there was produced salt (2) characterized by a melting point of 259°–261° C.

Example 1(d)

Following the procedure of Example 1(a) but employing phenethyl bromide there was produced salt (3) characterized by a melting point of 253°–255° C.

Example 2

Use of the Dye a) Cuvette system (ex. for calibration with solutions of known viscosity, ex. sucrose/water, as measured with a capillary viscometer).

The dye was added to liquid to a concentration of 3.8E–5M; 3 mL of this was placed in a cuvette and inserted in a PTI Deltascan 4000 spectrofluorimeter for analysis of dual fluorescence through the bulk of the sample.

b) Imaging of individual living cells.

Cultured cells (ex. smooth muscle) adhering to slides were incubated at 37° C. in Hank's buffer with penetrable dye (see below) at concentrations of 3–8E–5M for 10 minutes, then washed 3× with Hank's buffer, then placed under a Nikkon microscope connected to a PTI Deltascan 4000 spectrofluorimeter for real-time visual observation, and quantitative measurement of fluorescence at selected points, or over the whole image. Examination of the cells while changing focus established the dye to be distributed throughout the cytoplasm inside the cell, and not in either the nucleus or the membrane. In the case of the salts (I) in which $R_1$ and $R_2$ were both methyl and R was —CH$_2$Ph or —CH$_2$CH$_2$Ph, the dye slowly leaked out again at 37° C., but not if the temperature was lowered to 25° C. during washing and observation (cells subjected to this treatment and returned to the incubator were still alive 24 hours later). The salts in which $R_1$ and $R_2$ were methyl and R was —CH$_2$CH$_2$NMe$_2$ or —CH$_2$COO$^-$ did not penetrate the cell membrane; the salt in which $R_1$ and $R_2$ were methyl and R was —CH$_2$COOBu initially penetrated but became non-penetrating as enzymes digested it to —CH$_2$COO$^-$ once inside the cell.

Figure 2A:
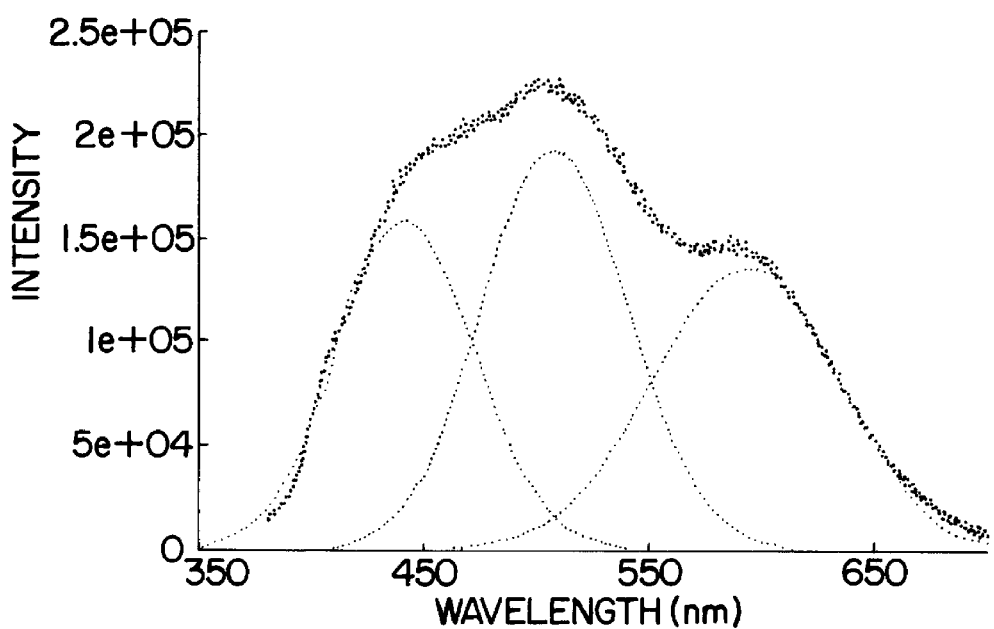
FIGS. 2A and 2B illustrate graphically changes in the emission spectrum from a single excitation for a compound (I) of the invention, with change in viscosity.
Figure 2B:
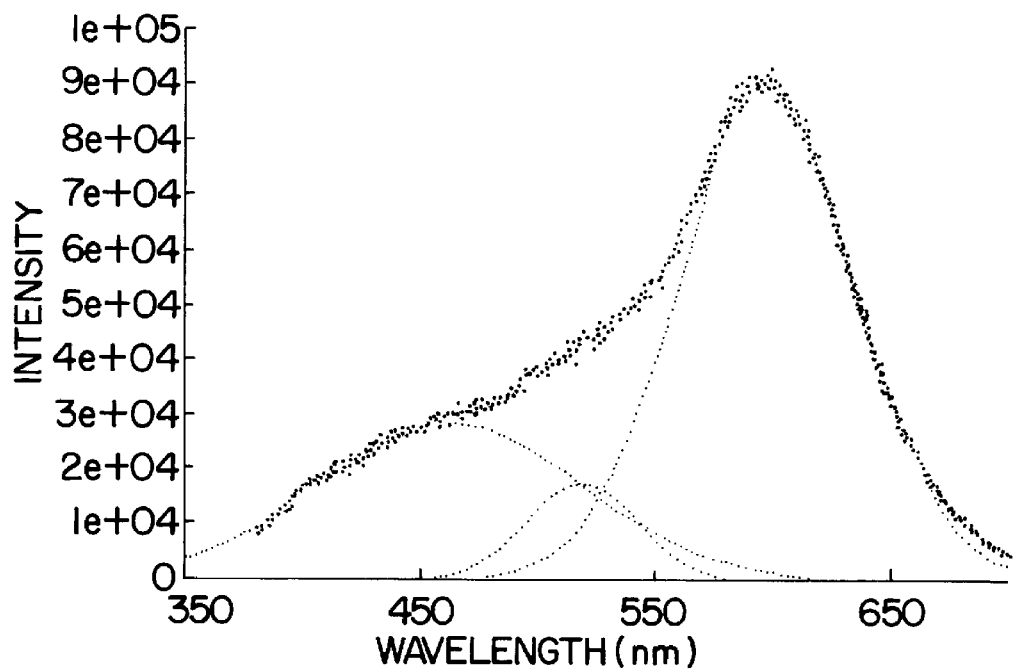
Figure 3:
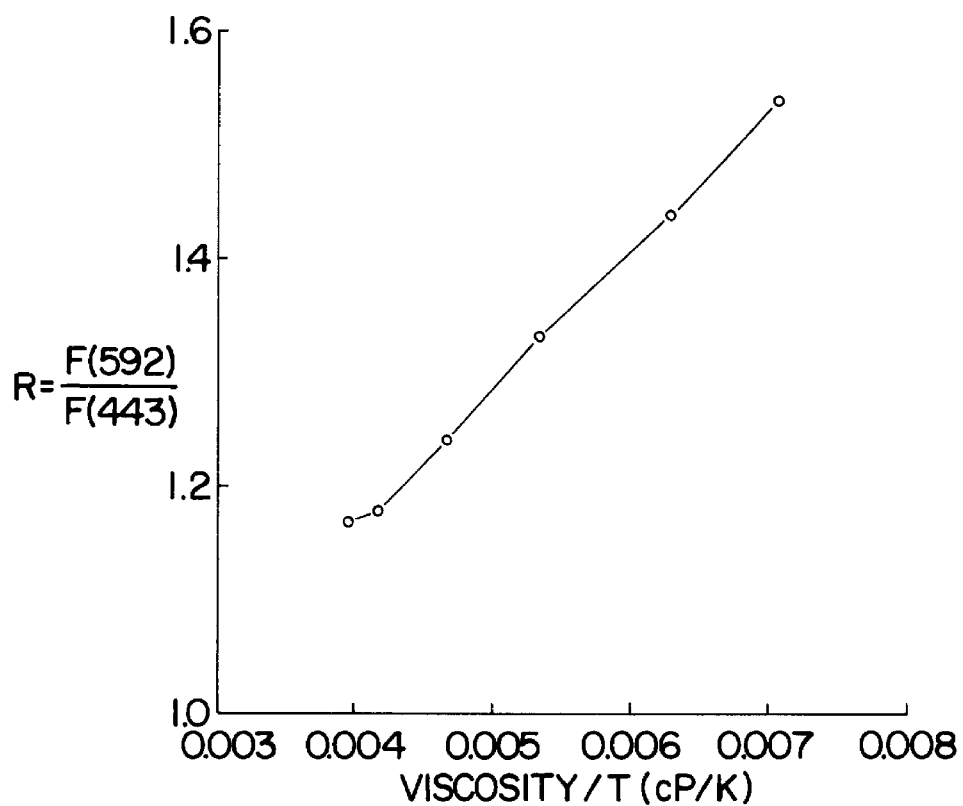
FIG. 3 is a calibration curve for the compound (I) of the invention, employing single excitation-double emission (ratioing) mode.

There are three modes of measuring viscosity by fluorescence of probes of the invention (with calibration vs other viscometry techniques possible in any of the modes) of which b) and c) below (made possible by the phenomenon of "dual fluorescence" in these molecules) have the advantage of involving ratioing, thus being independent of excitation intensity, dye concentration or sample geometry:

a) Single excitation-single emission: upon excitation at a single wavelength (ex. at 469 nm), absolute intensity of one emission peak (ex. at 603 nm) depends on viscosity of solution; numerical quantum yield could be obtained by comparison with a standard (rhodamine B/ethanol) in a separate cuvette. However, besides viscosity-dependent quantum yield of fluorescence, intensity of emission is also a function of intensity of excitation, dye concentration and path length through sample (i.e., dimensions or geometry of sample). FIG. 1 is a calibration curve generated in this way.

b) Single excitation-double emission Following a single excitation (ex at 369 nm), by observing and comparing the intensities of emission at two wavelengths, at one of which emission is very viscosity-dependent (ex. 592 nm) and at the other less or not (ex. 443 nm), viscosity can be deduced without having to know excitation intensity, dye concentration or sample geometry. The change in relative sizes of two peaks with viscosity is illustrated by FIGS. 2a and 2b. FIG. 3 is a calibration curve that makes use of this excitation-intensity/concentration/geometry-independent ratio, and so illustrates a different concept than FIG. 1.

c) Double excitation-single emission. In this second ratioing technique, it is the changing shape of the excitation spectrum for a given emission that is made use of. The intensity of the same emission peak (ex. 600 nm) when excited at one wavelength at which it is sensitive to viscosity (ex. 469 nm), is compared to its intensity when excited at another wavelength (ex. 360 nm) at which it is rather less viscosity-sensitive. Viscosity measurements of living cells (FIG. 4) were obtained in this way.

The human eye may judge the intensity of fluorescence involved in mode a), and the colour (blend of hues) involved in mode b), but is less useful by itself for mode c).

Data for FIGS. 1–3 came from experiments on ca. 2 mL volumes.

FIG. 1: Quantum yield of emission at 603 nm, upon excitation at 469 nm (single excitation-single emission), of 4-(4-dimethylamino)styryl)-1-phenethylpyridinium bromide in water+glycerol of increasing viscosities (0 g/L and 0.95 cP, to 560 g/L and 4–5 cP).

FIG. 2a: Emission spectrum, upon excitation at 369 nm, from 4-(4-dimethylamino)styryl)-1-phenethylpyridinium bromide in water (viscosity=0.95 cP).

FIG. 2b: Emission spectrum, upon excitation at 369 nm, from 4-(4-dimethylamino)styryl)-1-phenethylpyridinium bromide in 60% glycerol/$H_2O$ solution (viscosity=5 cP).

FIG. 3: Ratio of emission intensities at 592 nm and 443 nm, upon excitation at 360 nm (single excitation-double emission), from 4-(4-dimethylamino)styryl)-1-phenethylpyridinium bromide, vs viscosity/temperature in sucrose/water solutions of different concentrations, from 0 (0–95 cP) to 280 g/L.

Figure 4:
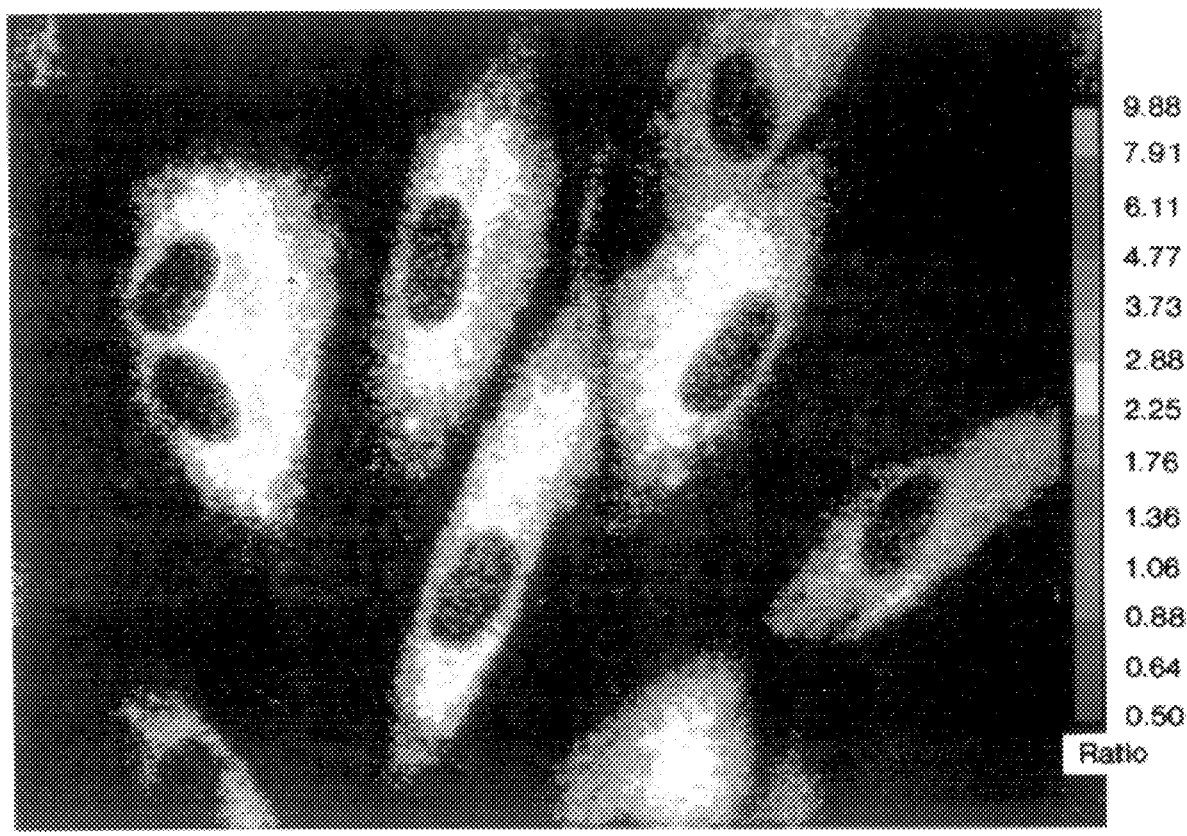
FIG. 4 is a photograph showing a map of viscosities by fluorescence in smooth muscle cells in culture, employing double excitation-single emission (also ratioing) mode.

FIG. 4: (Black-and-white reproduction of) colour figure showing map of viscosities in smooth muscle cells in culture. Cells were treated with 4-(4-dimethylamino)styryl)-1-(1-butoxy)carbonylmethyl-pyridinium chloride in water for 20 minutes then washed with fresh buffer. Black shows where dye was not present outside cells and within cell nuclei. Remaining shades show regions of viscosity ranges of 1.36–1.75, 1.76–2.25, 2.25–2.88 and 2.88–3.73 cP, as measured by comparison of emissions at 600 nm from excitations at 469 and 360 nm (double excitation-single emission).

We claim:

1. A substituted aminostyrylpyridinium salt of formula (I):

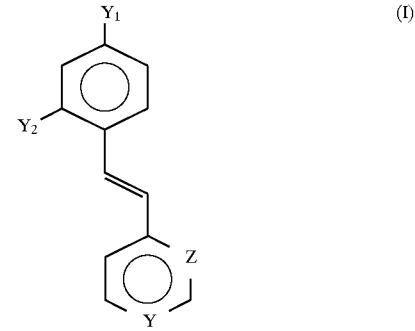

wherein $Y_1$ is

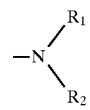

and $Y_2$ is H; $R_1$ and $R_2$, which are the same or different are straight or branched chain lower alkyl of 1 to 6 carbon atoms or $R_1$ and $R_2$ together with the N atom to which they are attached form a cyclic ring of 5 or 6 ring atoms; one of Z and Y is >N$^+$—R X$^-$ and the other is CH; R is selected from the group consisting of (a) —$(CH_2)_m COOR_4$ in which m is an integer of 1 to 10 and $R_4$ is a straight or branched chain alkyl of 3 to 18 carbon atoms, aryl of 6 to 14 carbon atoms, aralkyl in which the alkylene moiety has 1 to 18 carbon atoms and the aryl moiety has 6 to 14 carbon atoms, said aryl and aryl moiety being unsubstituted or substituted one or more times by one or more of nitro, fluoro, chloro, bromo, iodo and carboxylate; (b) —$(CH_2)_p ArCOO^-$ in which p is 0 to 15, Ar is arylene of 6 to 14 carbon atoms unsubstituted or substituted one or more times by one or more of nitro, fluoro, chloro, bromo, iodo, carboxylate or —$COOR_4$ in which $R_4$ is as defined above, and (c) —$(CH_2)_p ArCOOR^4$ in which p, Ar and $R^4$ are as defined above, and X$^-$ is selected from the group consisting of chloride, bromide, iodide, toslylate, mesylate and brosylate.

2. The salt according to claim 1, being a dialkylaminostyrylpyridinium salt of formula (II):

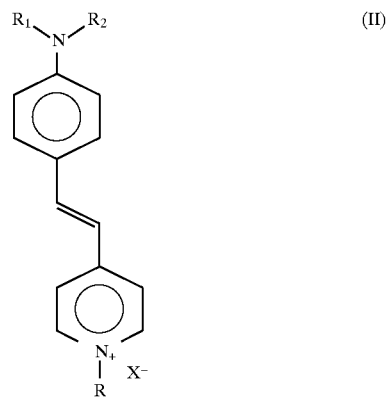

wherein $R_1$ and $R_2$, which are the same or different are straight or branched chain lower alkyl of 1 to 6 carbons;

R is —$(CH_2)_m COOR_4$ in which m is an integer of 1 to 10 and $R_4$ is a straight or branched chain alkyl of 3 of 6 carbon atoms; and $X^-$ is a halide ion selected from the group consisting of chloride, bromide and iodide.

3. The salt according to claim 2, in which $R_1$ and $R_2$ are both methyl, R is —$CH_2COOBu$, in which Bu is n-butyl and $X^-$ is chloride.

* * * * *